US012802714B2

(12) United States Patent
Wang et al.

(10) Patent No.: US 12,802,714 B2
(45) Date of Patent: Nov. 17, 2026

(54) MULTI-MODE EMOTION RECOGNITION METHOD, SYSTEM, ELECTRONIC DEVICE AND STORAGE MEDIUM TO EXTRACT GLOBAL VOICE FEATURES BETWEEN SMALL VOICE SEGMENT PATCHES

(71) Applicant: CENTRAL CHINA NORMAL UNIVERSITY, Hubei (CN)

(72) Inventors: Bing Wang, Hubei (CN); Zengzhao Chen, Hubei (CN); Zhifeng Wang, Hubei (CN); Chuanxu Zhao, Hubei (CN); Qiuyu Zheng, Hubei (CN); Zheng Wang, Hubei (CN); Wenkai Huang, Hubei (CN); Chuan Liu, Hubei (CN); Cheng Zou, Hubei (CN)

(73) Assignee: CENTRAL CHINA NORMAL UNIVERSITY, Hubei (CN)

( * ) Notice: Subject to any disclaimer, the term of this patent is extended or adjusted under 35 U.S.C. 154(b) by 182 days.

(21) Appl. No.: 18/811,705

(22) Filed: Aug. 21, 2024

(65) Prior Publication Data

US 2025/0329342 A1 Oct. 23, 2025

(30) Foreign Application Priority Data

Apr. 23, 2024 (CN) ........................ 202410491843.X

(51) Int. Cl.

| | |
|---|---|
| ***G10L 25/63*** | (2013.01) |
| ***G06F 18/213*** | (2023.01) |
| ***G06F 18/241*** | (2023.01) |
| ***G06F 18/25*** | (2023.01) |
| ***G06N 3/045*** | (2023.01) |

(Continued)

(52) U.S. Cl.

CPC .............. *G10L 25/63* (2013.01); *G10L 15/16* (2013.01); *G10L 17/04* (2013.01); *G10L 25/18* (2013.01); *G06F 18/213* (2023.01); *G06F 18/241* (2023.01); *G06F 18/256* (2023.01); *G06N 3/045* (2023.01); *G06N 3/0455* (2023.01); *G06N 3/08* (2013.01); *G10L 15/02* (2013.01); *G10L 15/06* (2013.01); *G10L 25/30* (2013.01)

(58) Field of Classification Search

None

See application file for complete search history.

(56) References Cited

FOREIGN PATENT DOCUMENTS

| | | | | | |
|---|---|---|---|---|---|
| CN | 116682463 | A | * | 9/2023 | ............. G10L 15/02 |
| CN | 116721673 | A | * | 9/2023 | ............. G10L 15/06 |

* cited by examiner

*Primary Examiner* — Farzad Kazeminezhad

(74) *Attorney, Agent, or Firm* — JCIPRNET

(57) ABSTRACT

Disclosed are a multi-mode emotion recognition method, a system, an electronic device, and a storage medium. The method includes obtaining a spectrogram of a voice to be recognized and a corresponding text and inputting the spectrogram and the text into a multi-mode emotion recognition model to obtain an emotion recognition result output by the multi-mode emotion recognition model. The multi-mode emotion recognition model is trained based on a sample spectrogram, and a corresponding sample text, and a sample emotion recognition result, and is configured to extract a feature from the spectrogram and the text by a self-attention mechanism to obtain the voice features and the text feature, fuse the text feature and voice feature to obtain a multi-mode fusion feature, and make an emotion classification decision to obtain an emotion recognition result based on the text feature, the voice feature, and the multi-mode fusion feature.

10 Claims, 8 Drawing Sheets

(51) Int. Cl.

| | |
|---|---|
| ***G06N 3/0455*** | (2023.01) |
| ***G06N 3/08*** | (2023.01) |
| ***G10L 15/02*** | (2006.01) |
| ***G10L 15/06*** | (2013.01) |
| ***G10L 15/16*** | (2006.01) |
| ***G10L 17/04*** | (2013.01) |
| ***G10L 25/18*** | (2013.01) |
| ***G10L 25/30*** | (2013.01) |

MULTI-MODE EMOTION RECOGNITION METHOD, SYSTEM, ELECTRONIC DEVICE AND STORAGE MEDIUM TO EXTRACT GLOBAL VOICE FEATURES BETWEEN SMALL VOICE SEGMENT PATCHES

CROSS-REFERENCE TO RELATED APPLICATION

This application claims the priority benefit of China application serial no. 202410491843.X, filed on Apr. 23, 2024. The entirety of the above-mentioned patent application is hereby incorporated by reference herein and made a part of this specification.

BACKGROUND

Technical Field

The disclosure relates to a field of human-computer interaction technology, and in particular to a method, a system, an electronic device, and a storage medium of multi-mode emotion recognition.

Description of Related Art

Emotion recognition has become an important topic in the field of human-computer interaction and has received extensive attention and research in recent years. Different modes such as text and voice may express different emotions, such as happiness and anger. With the rapid development of artificial intelligence and machine learning technologies, emotion recognition has made significant progress in different modes such as text and voice.

However, existing technologies usually take a single audio or text as input and use a single mode for emotion analysis. For example, text emotion analysis only focuses on analyzing, mining, and inferring the emotions contained in the text. The only classification result is used as the basis for decision making, which lacks robustness and accuracy.

SUMMARY

In view of the defects of the related art, the purpose of the disclosure is to provide a multi-mode emotion recognition method, a system, an electronic device, and a storage medium, aiming to solve the problem that the conventional emotion recognition methods lack robustness and accuracy.

To achieve the above objectives, in the first aspect, the disclosure provides a multi-mode emotion recognition method including the following steps. A spectrogram of a voice to be recognized and a corresponding text are obtained. The spectrogram and the corresponding text are input into a multi-mode emotion recognition model to obtain an emotion recognition result output by the multi-mode emotion recognition model. The multi-mode emotion recognition model is trained based on a sample spectrogram, and a corresponding sample text, and a sample emotion recognition result, the multi-mode emotion recognition model is configured to extract a feature from the spectrogram and the corresponding text by a self-attention mechanism to obtain a voice feature and a text feature, fuse features of the text feature and the voice feature to obtain a multi-mode fusion feature, and make an emotion classification decision to obtain an emotion recognition result based on the text feature, the voice feature, and the multi-mode fusion feature.

In an optional example, the multi-mode emotion recognition model specifically extracts the feature from the spectrogram by a voice feature extraction network, and the voice feature extraction network comprises a patch embedding layer, a plurality of voice feature extraction layers based on a local self-attention mechanism and a global self-attention mechanism, and a Transformer encoder connected in sequence.

In an optional example, each voice feature extraction layer comprises a convolutional pooling layer, a patch embedding layer, a plurality of voice encoder layers, and an aggregation layer connected in sequence, and each voice encoder layer is configured to extract the local feature within each patch by the local self-attention mechanism first, extract features between patches to obtain a global sequence feature by the global self-attention mechanism, and finally perform a nonlinear transformation on the global sequence feature.

In an optional example, fusing the text feature and the voice feature to obtain the multi-mode fusion feature includes concatenating the text feature and the voice feature to obtain a concatenated feature, and extracting an attention feature from the concatenated feature by a multi-head attention mechanism to obtain the multi-mode fusion feature.

In an optional example, making the emotion classification decision to obtain the emotion recognition result based on the text feature, the voice feature, and the multi-mode fusion feature includes making the emotion classification decision respectively to obtain a text decision result, a voice decision result, and a multi-mode decision result based on the text feature, the voice feature, and the multi-mode fusion feature, and adaptively and dynamically weighted fusing the text decision result, the voice decision result, and the multi-mode decision result to obtain the emotion recognition result.

In the second aspect, the disclosure provides a multi-mode emotion recognition system including a data acquisition module and an emotion recognition module. The data acquisition module is configured to obtain ta spectrogram of a voice to be recognized and a corresponding text. The emotion recognition module is configured to input the spectrogram and the corresponding text into a multi-mode emotion recognition model to obtain an emotion recognition result output by the multi-mode emotion recognition model. The multi-mode emotion recognition model is trained based on a sample spectrogram, and a corresponding sample text, and a sample emotion recognition result, the multi-mode emotion recognition model is configured to extract a feature from the spectrogram and the corresponding text by a self-attention mechanism to obtain a voice feature and a text feature, fuse features of the text features and the voice features to obtain a multi-mode fusion feature, and make an emotion classification decision based on the text feature, the voice feature and the multi-mode fusion feature to obtain an emotion recognition result.

In an optional example, the multi-mode emotion recognition model specifically extracts the feature from the spectrogram by a voice feature extraction network, and the voice feature extraction network comprises a patch embedding layer, a plurality of voice feature extraction layers based on a local self-attention mechanism and a global self-attention mechanism, and a Transformer encoder connected in sequence.

In the third aspect, the disclosure provides an electronic device including at least one memory and at least one processor. The memory is configured to store a computer program. The processor is configured to execute the computer program stored in the memory. The processor is configured to execute the method described in the first aspect or any possible implementation of the first aspect when the computer program stored in the memory is executed.

In the fourth aspect, the disclosure provides a computer-readable storage medium stored in a computer program, where the processor is caused to execute the method described in the first aspect or any possible implementation of the first aspect when the computer program is executed on a processor.

In the fifth aspect, the disclosure provides a computer program product, where the processor is caused to execute the method described in the first aspect or any possible implementation of the first aspect when the computer program product is executed on a processor It should be understood that the beneficial effects of the second aspect to the fifth aspect may be found in the relevant description of the first aspect, which is not be repeated herein.

DESCRIPTION OF THE EMBODIMENTS

Figure 1:
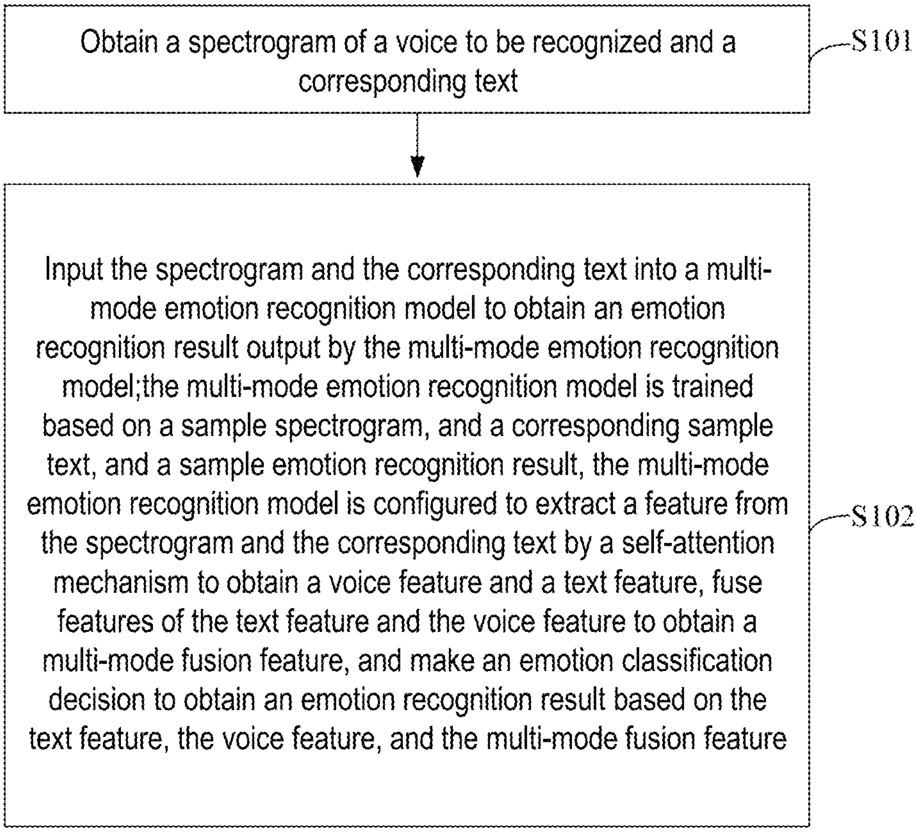
FIG. 1 is a flow chart of a multi-mode emotion recognition method according to an embodiment of the disclosure.

In order to make the objectives, technical solutions, and advantages of the disclosure comprehensible, the disclosure is further described in detail below in conjunction with the accompanying drawings and embodiments. It should be understood that the specific embodiments described herein are only used to explain the disclosure and are not used to limit the disclosure.

According to the embodiments of the disclosure, terms such as "exemplary" or "for example" are used to indicate examples, illustrations, or descriptions. Any embodiment or design described as "exemplary" or "for example" in the embodiments of the disclosure should not be construed as being preferred or advantageous over other embodiments or designs. Rather, the use of terms such as "exemplary" or "for example" are intended to present the relevant concepts in a concrete fashion.

In the description of the embodiments of the disclosure, unless otherwise specified, the meaning of "multiple" refers to two or more than two, for example, multiple voice feature extraction layers refer to two or more than two voice feature extraction layers, and multiple voice encoder layers refer to two or more than two voice encoder layers.

In existing research, emotion analysis often focuses on a single mode, which ignores the role of other modes. Emotion recognition technology targeting a single mode is relatively monotonous for the emotion analysis and has low fault tolerance, which ignores the fact that information of different modes may complement each other and help machines better understand emotions. In addition, compared with a visual mode and a textual mode, an acoustic mode has long been in a marginal position. That is, while the acoustics is improved, the combination of multiple modes is more conducive to the efficiency and accuracy of the entire emotion recognition task. Moreover, in the conventional technology of single-mode emotion analysis, only shallow feature extraction is performed on text and audio, which makes it difficult to fully explore the deep emotional information, resulting in a mediocre classification effect. When a spectrogram is processed based on a traditional convolutional network such as CNN, there is a lack of self-attention mechanism, which is impossible to learn the long-term dependencies between the elements of the spectrum automatically.

In this regard, the disclosure proposes an emotion recognition method based on a multi-mode spatiotemporal-attention fusion mechanism. This method constructs two feature extraction networks to extract and process features of different modes, text and voice. For text mode processing, a feature is extracted based on the pre-trained model ALBERT, and then the context information is processed by a Transformer. For the voice mode, a spectrogram feature of the voice is adopted, and is divided into patches. For local patch, self-attention is adopted to extract local information. Self-attention Encoder is adopted to fuse features interactively between patchs. A multi-scale hierarchical nested Transformer is adopted to extract the feature from the spectrogram, and the context information is processed by the Transformer. A multi-head attention mechanism is adopted to fuse the features of the text and audio modes. Emotion classification decisions are made according to a multi-mode fusion feature, a single-mode text feature, and a single-mode audio feature respectively, and then multi-mode weighting is adopted to fuse the feature decision results between different modes. Extensive experiments are carried out on the IEMOCAP dataset, and the results demonstrate the effectiveness and performance advantages of this method.

An embodiment of the disclosure provides a multi-mode emotion recognition method. FIG. 1 is a flow chart of a multi-mode emotion recognition method according to an embodiment of the disclosure. As shown in FIG. 1, the method includes the following steps. In Step S101, obtaining the spectrogram of the voice to be recognized and a corresponding text are obtained. Here, the voice to be recognized is the voice that needs to be performed the emotion recognition, which may be the voice collected in real time or the pre-recorded voice, and the embodiment of the disclosure is not limited thereto. The text matches the voice to be recognized. Specifically, the text may be the text obtained by transcribing the voice to be recognized, or may be the text based on the recording of the voice to be recognized, and the embodiment of the disclosure is not limited thereto. In Step S102, the spectrogram and the text are input into a multi-mode emotion recognition model to obtain an emotion recognition result output by the multi-mode emotion recognition model. The multi-mode emotion recognition model is trained based on a sample spectrogram, a corresponding sample text, and a sample emotion recognition result. The multi-mode emotion recognition model is configured to perform the feature extraction on both the spectrogram and the text by the self-attention mechanism to obtain the voice feature and the text feature and perform the feature fusion on the text feature and voice feature to obtain the multi-mode fusion feature. Moreover, the emotion classification decision is performed based on the text feature, the voice feature, and the multi-mode fusion feature to obtain an emotion recognition result.

Specifically, the spectrogram and the text of the voice to be recognized are input into the multi-mode emotion recognition model together for multi-mode emotion recognition, so that the emotion recognition result of the voice to be recognized output by the multi-mode emotion recognition model may be obtained. The emotion recognition result may include the probability that the voice to be recognized belongs to each emotion category. The emotion category with the highest probability is the emotion category to which the voice to be recognized and the text belong. The emotion category may include happiness, anger, neutral, sadness, etc.

In addition, before the Step S102 is executed, the multi-mode emotion recognition model is trained in advance. First, a large number of sample spectrograms of sample voice and corresponding sample texts are collected to obtain sample emotion recognition results by the annotation. The sample spectrograms, the corresponding sample texts, and the sample emotion recognition results are then used to train an initial model, thereby obtaining a trained multi-mode emotion recognition model.

The method provided in the embodiment of the disclosure constructs the multi-mode emotion recognition model and performs the feature extraction on both the spectrogram and the corresponding text by the self-attention mechanism, so as to capture the voice feature and text feature in contextual information, and then fuses the text feature and voice feature to obtain the multi-mode fusion feature, and finally combines the multi-mode fusion feature, the single-mode text feature, and the single-mode voice feature to make the emotion classification decision. Therefore, the information of different modes complements each other, improving the robustness and accuracy of emotion classification greatly.

Based on the aforementioned embodiments, a traditional audio emotion recognition method based on the spectrogram only considers to extract a single-scale feature and fails to fully utilize the rich local and global information contained in the spectrogram. Moreover, when the spectrogram is processed based on the traditional convolutional network such as CNN, there is a lack of self-attention mechanism, which is impossible to learn the long-term dependencies between the elements of the spectrum automatically.

In this regard, the multi-mode emotion recognition model described in the embodiment of the disclosure specifically extracts the feature from the spectrogram by a voice feature extraction network. The speech feature extraction network includes a patch embedding layer, multiple voice feature extraction layers based on a local self-attention mechanism and a global self-attention mechanism, and a Transformer encoder connected in sequence.

Specifically, in order to obtain the optimal spatiotemporal representation of a voice signal and realize granular emotion analysis, the disclosure designs a method for encoding voice sequences by a multi-scale Transformer architecture based on hierarchical self-attention. That is, the voice feature extraction network is specially designed for processing a voice spectrogram. The network combines the convolutional neural network and the self-attention mechanism to capture local and global features, thereby obtaining global contextual feature of the voice.

In the initial stage of the model, the voice spectrogram first encodes the dimension by the patch embedding layer. After the dimension is changed by the encoder, the original 4-dimensional feature are expanded to 128 dimensions. This dimensionality expansion is usually done to increase the model in expression, enabling the model to capture more complex features and patterns.

Afterwards, the voice spectrogram is sent to the voice feature extraction layer (SRELevel). In each layer of SRELevel, through the combination of local self-attention and global self-attention, the low-level local feature and the high-level global feature are effectively fused. The model may effectively integrate the fine-grained information and the long-term dependencies from the voice signal, which enhances the ability of the model to capture local features of speech, and improves the understanding of the overall voice content and the accuracy of the emotion analysis.

Finally, the voice spectrogram passes through an audio feature transformer encoder (AFE) layer. The AFE layer specifically adopts the Transformer encoder. After passing through the multi-layer Transformer structure, the AFE layer may extract the complex features in the voice data and integrate these features into a global and semantically rich representation, which helps the model capture key information in the voice data, such as the emotional tendency of the voice. At the same time, the AFE layer applies the self-attention mechanism on the serialized feature, enabling the model to capture the relationship between different time points in the voice sequence and finally output the voice feature, which is particularly important for understanding the emotional content of voice, as emotion is often associated with the voice features such as rhythm, intensity, and pitch.

The finding of experiments is that the optimal number of cascaded layers of the voice feature extraction layer may be three layers, which may achieve better emotion recognition effects. If there are more layers, the improvement effect is not significant and more machine resources are consumed.

Based on any of the above embodiments, each voice feature extraction layer includes a convolutional pooling layer, a patch embedding layer, multiple voice encoder layers, and an aggregation layer connected in sequence. Each voice encoder layer is configured to extract the local feature within each patch by the local self-attention mechanism first, then extract the feature between patches by the global self-attention mechanism to obtain a global sequence feature, and finally performs nonlinear transformation on the global sequence feature.

Specifically, each voice feature extraction layer SRELevel is first preprocessed by the convolutional pooling layer. The convolutional layer extracts local features in the spectrogram, such as pitch, rhythm, and timbre by a series of filters. The pooling operation decreases the spatial dimension of the feature map, reducing the computational burden of subsequent processing while retaining the key information. Through the collaboration of the convolutional layer and the pooling layer, the disclosure conducts multi-scale learning of the input spectrogram from micro to macro, constructs robust local feature extraction for multi-scale learning of the input spectrogram from micro to macro, increasing the generalization ability of the model.

After being processed by the patch embedding layer, the voice spectrogram is converted into a series of feature sequences, and is divided into multiple small patches. Each of the small patches represents a local area of the voice. These sequences are then fed into the voice encoder layer designed by the disclosure. Here, a number of divided patches may be determined based on the final recognition effect. Since the voice spectrogram is a three-dimensional spectrogram, each small patch contains voice segments at different times. The relationship between different voice segments may also be modeled through the local self-attention mechanism within the patch.

Subsequently, the voice spectrogram passes through each voice encoder layer in sequence. Each encoder layer includes attention and a feedforward neural network (FFN) layer. The voice encoder layer is configured to extract the local feature within the patch by the local self-attention mechanism first and extract features between patches by the global self-attention mechanism to obtain the global sequence feature. Finally, the global sequence feature is nonlinearly transformed by the FFN layer to capture the complex patterns and relationships of the input sequence. Each layer of encoder increases the receptive field of the model. The receptive field of the high-level encoder is larger, which may model longer voice sequences, enabling the model to capture a wider range of contextual information and ultimately output global voice sequence feature. By stacking multiple encoder layer layers, the model may learn dependencies across multiple time steps to obtain the global voice features. The specific number of cascaded layers of the voice encoder layer may also be determined based on the final recognition effect.

The feature output by each voice encoder layer are then aggregated by the aggregation layer. This aggregation helps to integrate information from different small patches to form a global voice feature representation. Finally, the voice feature is output by the AFE layer based on the Transformer encoder as the input of the fusion module.

Based on any of the above embodiments, the text feature extraction network used for the feature extraction of text in the multi-mode emotion recognition model may be specifically constructed on the basis of the pre-trained language model ALBERT (A Lite BERT, which is lightweight BERT) by fine-tuning ALBERT and optimizing the pooling strategy, that is, adding a pooling layer. The final constructed text feature extraction network may map the text into a word vector representation in contextual semantics and syntactic information.

Compared with models such as BERT, ALBERT significantly reduces a number of parameters and computational complexity while maintaining performance through strategies such as parameter compression and pre-training task reconstruction. By fine-tuning and optimizing the pooling strategy, the text is mapped into the word vector representation in contextual semantics, effectively improving the text semantic modeling capabilities. Through experimental comparison, the text feature extraction network constructed by adding the pooling layer to ALBERT may achieve better emotion recognition results than the text feature extraction network constructed by using ALBERT or adding other layers.

Based on any of the above embodiments, the feature fusion is performed on the text feature and the voice feature to obtain the multi-mode fusion feature, which specifically includes that the text feature and the voice feature are concatenated to obtain a concatenated feature, and then the multi-head attention mechanism is adopted to extract an attention feature from the concatenated feature to obtain the multi-mode fusion feature.

It should be noted that traditional fusion method such as simple feature concatenation has difficulty weighing the importance of different modes. The embodiment of the disclosure adopts the multi-head attention mechanism to fuse the feature layer. The multi-head attention mechanism learns the correlation between the two modes, weights the attention of each mode feature, and obtains the fused multi-modal fusion feature, which may further improve the accuracy of the subsequent emotion classification decisions.

Based on any of the above embodiments, the emotion classification decisions are performed to obtain the emotion recognition result based on the text feature, the voice feature, and the multi-mode fusion feature, which includes that the emotion classification decisions are made respectively to obtain a text decision result, a voice decision result, and a multi-mode decision result based on the text feature, the voice feature, and the multi-mode fusion feature, and the text decision result, the speech decision result, and the multi-mode decision result are adaptively and dynamically weighted fused to obtain the emotion recognition result.

The embodiment of the disclosure performs adaptive dynamic weighted fusion on the decision results obtained from three features (a multi-mode fusion feature, a single-mode text feature, and a single-mode voice feature), allowing the differences between the modes to be considered in the fusion process, achieving more efficient information fusion, and generating robust emotion classification. Different from simple equal fusion, weighted fusion may distinguish the roles of different modes, assign higher weights to important modes, and more intelligently fuse multi-mode information, while maintaining the advantages of simplicity and efficiency and being easy to implement.

Figure 2:
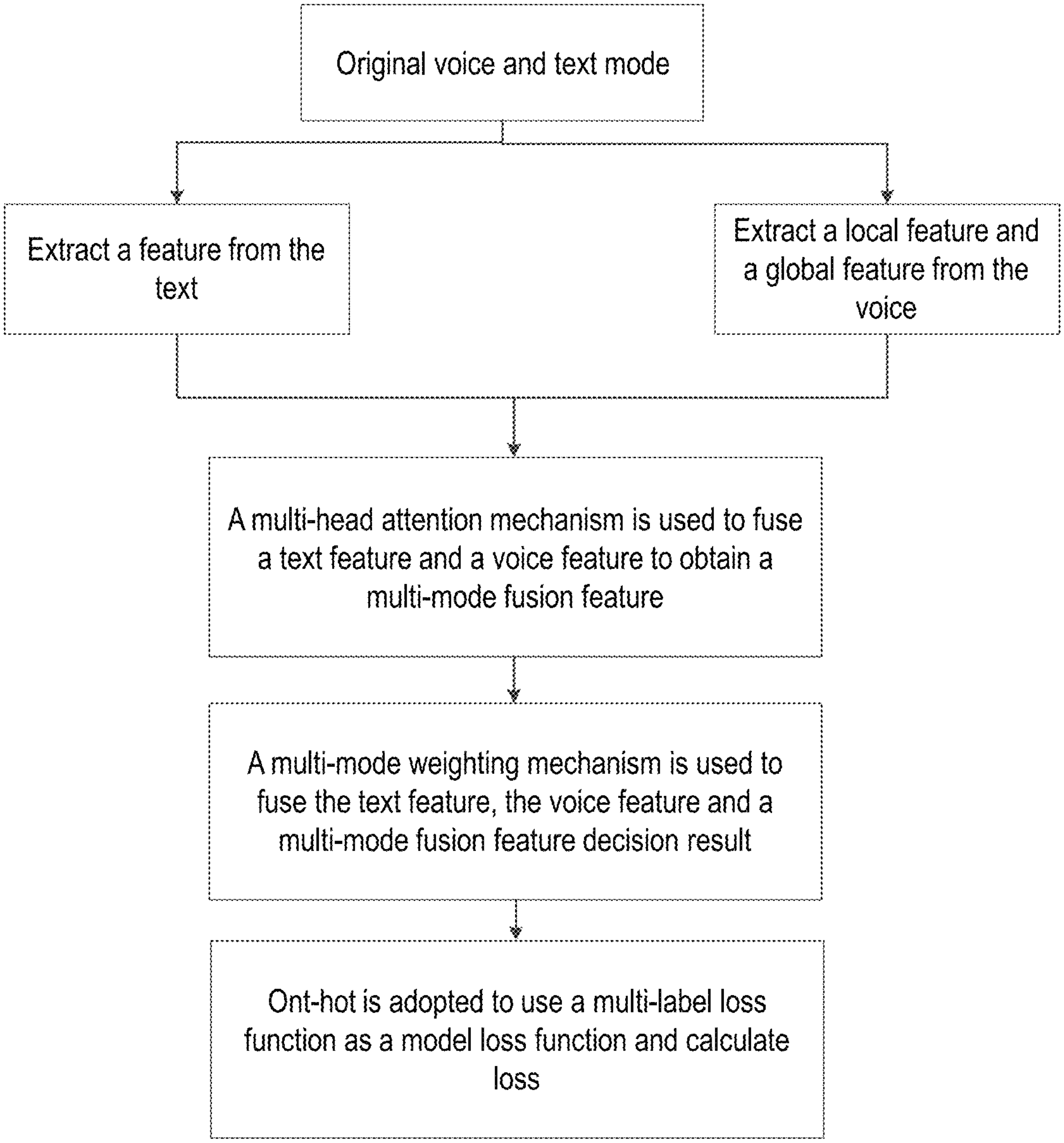
FIG. 2 is an architecture diagram of a multi-mode emotion recognition method according to an embodiment of the disclosure.

Based on any of the above embodiments, FIG. 2 is an architecture diagram of a multi-mode emotion recognition method according to an embodiment of the disclosure. As shown in FIG. 2, the multi-mode emotion recognition method is mainly composed of four parts. The first part is a text feature extraction module, that is, the text feature extraction network, which adopts the pre-trained language model ALBERT to mine the semantic feature of the text. By fine-tuning ALBERT and optimizing the pooling strategy, the text may be mapped into the word vector representations in contextual semantics.

The second part is a multi-level voice feature extraction module, that is, the voice feature extraction network. In order to capture the complexity and the richness of the voice signal fully, the disclosure proposes a hierarchical feature extraction network based on the CNN and the multi-head self-attention mechanism. The network is specially designed for processing the spectrogram representation of the voice, extracting a deep voice feature by combining local and global information, and fusing features of different scales. Specifically, the network of the disclosure first divides the input spectrogram into multiple non-overlapping patches. Each patch represents a local area of the voice signal. Local dependencies are learned by using the local self-attention mechanism within a patch, allowing the model to capture the local voice feature. For cross-patch feature extraction, the disclosure adopts the global self-attention mechanism to learn the associations between different patches, achieve inter-patch fusion, and obtain the global sequence feature. The hierarchical attention structure may effectively enhance the ability to model voice details and context. The network of the disclosure also integrates convolutional layers, and downsamples the spectrogram at different levels while increasing the depth of the feature map, which helps the model learn multi-scale features from coarse to fine. The multi-scale processing strategy of the convolutional layer enhances the ability of the model to capture different scale features of the voice signal.

In the third part, the multi-mode feature fusion module innovatively adopts the multi-head attention mechanism to fuse the extracted text and voice feature. This mechanism may adaptively learn the correlation between features of different modes, dynamically adjust the attention weight of each mode, and achieve efficient information fusion.

In the fourth part, the loss function is used to optimize the training of the overall model and output the emotion classification results of each batch of voice and text segments. At the same time, combined with a decision result of a single-mode classifier, an adaptive dynamic weighted fusion strategy is adopted to adaptively determine a corresponding weight according to the confidence of each decision, and the three-way decision results are weightedly fused to generate the final robust emotion classification result.

1. Multi-Scale Emotion Feature Extraction

1. Text Feature Extraction

Inspired by the success of pre-trained language model (PLM) in many NLP tasks, "pre-training and fine-tuning" has gradually become a new paradigm. The text may be converted into the word vector with contextual semantics by the pre-trained model such as BERT.

Considering a large number of parameters in the pre-trained model, the disclosure chooses ALBERT as a text encoder to ensure universality. Compared with BERT, which directly maps a word, one-hot, into a high-dimensional vector, ALBERT adopts a factor decomposition-based method to map the word into a low-dimensional space first and then to a high-dimensional space, similar to matrix decomposition. At the same time, ALBERT reduces the model size by a parameter sharing across layer.

Figure 3:
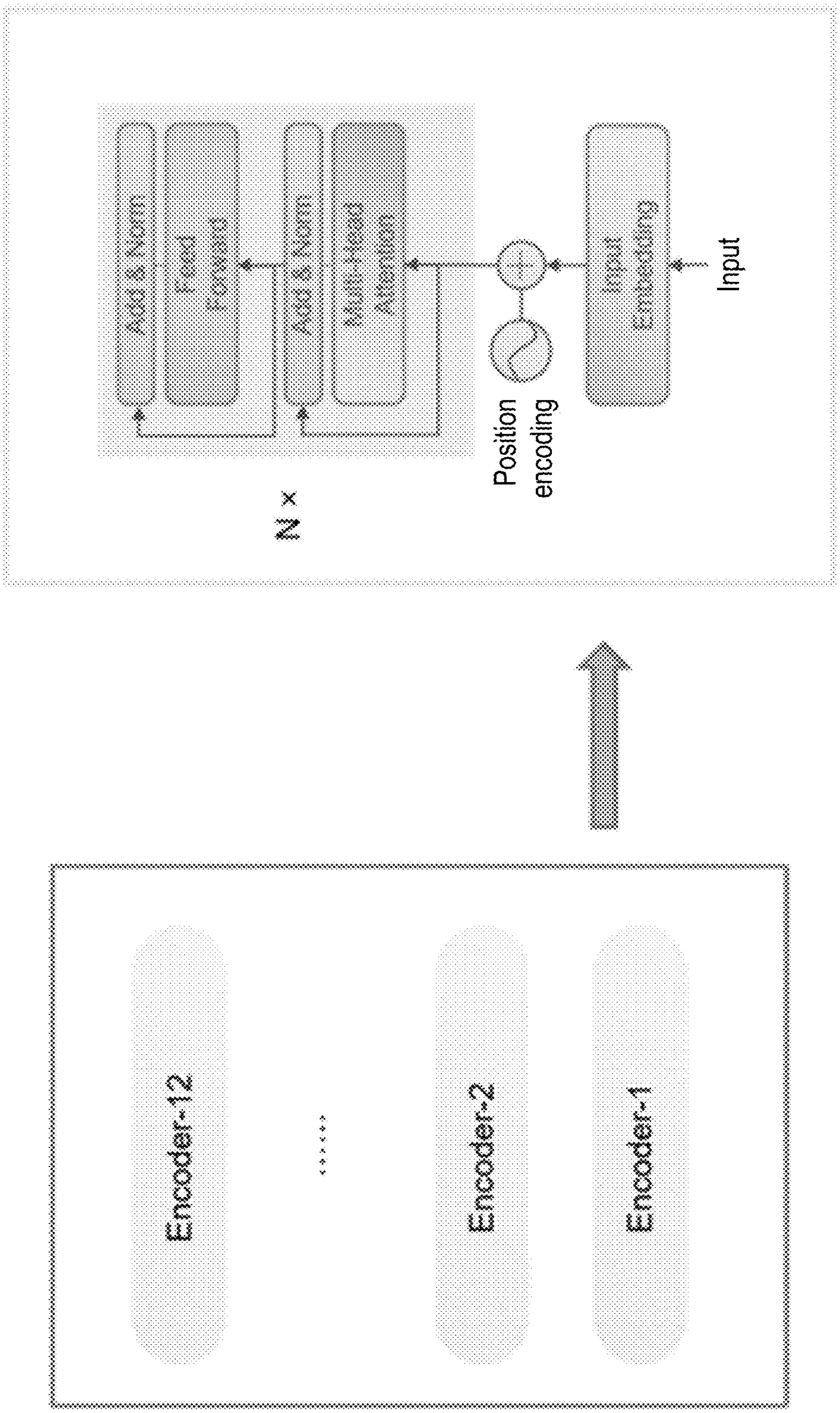
FIG. 3 is an architecture diagram of an ALBERT model according to an embodiment of the disclosure.

Specifically, the embodiment of the disclosure selects ALBERT-base as the text encoder. FIG. 3 is an architecture diagram of an ALBERT model according to an embodiment of the disclosure. As shown in FIG. 3, the ALBERT model is composed of twelve layers of Transformer encoders, which may map the text into a 768-dimensional vector. Each layer of the encoder includes a multi-head self-attention layer (multi-head attention in FIG. 3). For each sentence of input text, the word sequence is obtained by word segmentation, and then input into the pre-trained model ALBERT to encode the text sequence. ALBERT is a Transformer model pre-trained on a large amount of unlabeled corpus, which may capture the semantic and syntactic information of the text. The model outputs the semantic representation vector of the text, which is transformed into a vector sequence by selecting the CLS state of the last hidden layer as the feature representation of the text, that is, the text feature.

2. Voice Feature Extraction

In order to obtain the best spatiotemporal representation of the voice signal and realize the granular emotion analysis, the disclosure designs a method of encoding voice sequences by using a multi-scale Transformer architecture based on the hierarchical self-attention, that is, the voice feature extraction network is specially designed for processing the voice spectrogram. The network combines the CNN and the self-attention mechanism to capture local and global features, thereby obtaining global contextual features of the voice.

Figure 4:
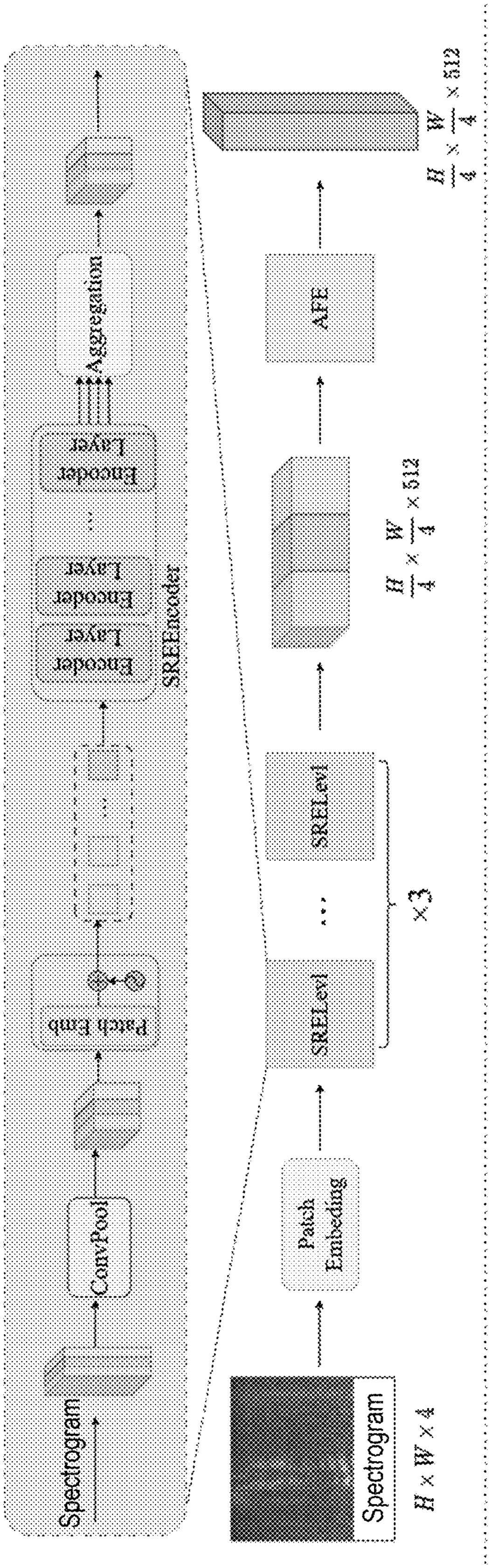
FIG. 4 is a schematic diagram of a complete structure of a voice feature extraction network according to an embodiment of the disclosure.

FIG. 4 is a schematic diagram of a complete structure of a voice feature extraction network according to an embodiment of the disclosure. As shown in FIG. 4, in the initial stage of the model, the voice spectrogram first performs patch embedding and dimensional encoding. At this time, the input spectrogram feature [32,32,4] is mapped into [32,32,128]. After the dimension is changed by the encoder, the original 4-dimensional feature is expanded to 128 dimensions. This dimensionality expansion is usually done to increase the model in expression, enabling the model to capture more complex features and patterns. Here, the original spectrogram is considered to be too large for processing, and if the original spectrogram is divided too small, the emotional information may be lost. Therefore, the original spectrogram may be divided into four parts, and each part is input into the voice feature extraction network to obtain the corresponding voice feature, and then concatenated to obtain the final voice features.

Afterwards, the original spectrogram is sent to the voice feature extraction layer (SRELevel). Each SRELevel layer is first preprocessed by the convolution pooling layer (ConvPool). The convolutional layer uses a series of filters to extract the local features in the spectrogram, such as pitch, rhythm, and timbre. The pooling operation decreases the spatial dimension of the feature map, reducing the computational burden of subsequent processing while retaining the key information. After the convolution operation, the feature dimension of the spectrogram changes from [32, 32, 128] to [16, 16, 256]. In the convolution stage, the disclosure uses 3×3 convolution, which is expressed as follows.

$$X_{out}(i, j) = \sum_{n=-1}^{1} \sum_{m=-1}^{1} W(n, m) * X(i+n, j+m) + b$$

Here $X_{out}(i, j)$ is an element of the output, W(n, m) is an element of the convolution kernel, X(i+n, j+m) is an element of the input, and b is the bias. The operation retains the input spectrum features, extracts the feature patterns in the local 3*3 region of the input 4 channels, and retains the time and frequency dimensions of the input spectrum. The operation expands a number of channels, aggregates information in time and frequency by the convolution kernel, extracts the local feature, and gradually enhances the feature expression.

Afterwards, the disclosure outputs the convolutional layer by a normalization layer to normalize the channel dimension, which helps to improve the numerical stability and convergence performance of the model. A formula is as follows.

$$X_{norm} = \frac{X_{out} - \mu}{\sqrt{\sigma^2 + \epsilon}}$$

In the formulate, μ is the mean, $\sigma^2$ is the variance, and e is a very small number to prevent division by zero.

Finally, in the pooling part, the model performs the maximum pooling operation and selects a stride size of 2 for the pooling operation. A formula is expressed as follows.

$$X_{pool}(i, j) = \max_{n=-1}^{1} \max_{m=-1}^{1} X_{norm}(i + 2n, j + 2m)$$

Here, the time and frequency dimensions are reduced to improve the generalization ability of the model. The voice signal usually has time/frequency offsets. The pooling operation may improve the feature invariance to time-frequency offsets. At the same time, multi-scale pooling may extract the combined expression of voice features at different granularities.

Through the collaboration of the convolutional layer and the pooling layer, the disclosure constructs the robust local feature extraction for the multi-scale learning of the input spectrogram from micro to macro, and increases the generalization ability of the model.

After being processed by the patch embedding, the voice spectrogram is converted into a series of feature sequences, and is divided into the small patches. Each of the small patches represents a local area of the voice. These sequences are then fed into the speech representation feature extraction encoder structure designed by the disclosure, that is, the voice encoder layer (SREEncoder).

In the hierarchical structure processing, the hierarchical structure is composed of multiple encoder layers. The disclosure adopts local and global self-attention mechanisms.

(1) Local Voice Feature Modeling Level

The voice spectrogram is divided into multiple patches. Each of the patches includes a local sequence of the voice. Within each patch, the local self-attention mechanism is used. The local self-attention mechanism focuses on capturing the local feature and details and only builds local dependencies within the module, thereby learning the voice feature within each small patch.

The self-attention mechanism is used to model the relationship between different voice segments, capture long-term dependencies, and establish the global feature. The specific calculation formula of the self-attention mechanism is as follows.

$$\mathrm{Attention}(Q, K, V) = \mathrm{softmax}\left(\frac{QK^T}{\sqrt{d_k}}\right)V$$

The attention mechanism uses a key-value to represent the content stored in memory, calculates the weight coefficient based on the query and the key, and performs a weighted sum on the value. In self-attention, the query, the key, and the value come from the same input x. By calculating the self-attention, the model may focus on the connections between different parts of the input. Within each patch, the model uses the self-attention mechanism to process the local voice feature and aggregate the local voice feature.

(2) at the Level of Global Sequence Feature Modeling Enhancement

The global voice feature involves the long-term dependencies and contextual information of the entire voice signal, which helps to understand the emotional content of the entire voice. The global feature is mainly obtained by the following two points.

① Multi-Layer Encoder Layer Structure

Each encoder layer learns to model the relationship between different patches by the self-attention mechanism. Each encoder layer includes the attention and the FFN layer. The attention module calculates the associations between different patches, obtains the feature map including the patches, realizes the global self-attention between patches, and thus realizes inter-patch fusion. After the local feature is extracted, the model further processes and integrates these features by the encoder layers. Each layer of the encoder increases the receptive field of the model. The receptive field of the high-level encoder is larger, which may model longer voice sequences, enabling the model to capture a wider range of contextual information and ultimately output the global voice sequence feature. By stacking the encoder layers, the model may learn dependencies across the time steps to obtain the global voice feature.

② Inter-Patch Aggregation

After each SREEncoder, the model may use a specific aggregation to merge features from different patches. The aggregation helps to integrate information from different small patches to form the global voice feature representation and obtain the global voice feature.

Through the combination of the local self-attention and the global self-attention, the low-level local feature is effectively fused with the high-level global feature, and the model may effectively integrate fine-grained information and long-term dependencies from the voice signal, which enhances the ability of the model to capture the local feature of the voice and improves the understanding of the overall voice content and the accuracy of the emotion analysis.

Finally, after passing through the AFE layer, the AFE layer may extract the complex features in the speech data by the multi-layer Transformer structure and integrate these features into a global and semantically rich representation, which helps the model capture key information in speech data, such as the emotional tendency of the speech. At the same time, the self-attention mechanism is applied to the serialized features, enabling the model to capture the relationship between different time points in the voice sequence, which is particularly important for understanding the emotional content of the voice, as emotion is often associated with the voice features such as rhythm, intensity, and pitch.

2. Multi-Mode Feature Fusion Module

Figure 5:
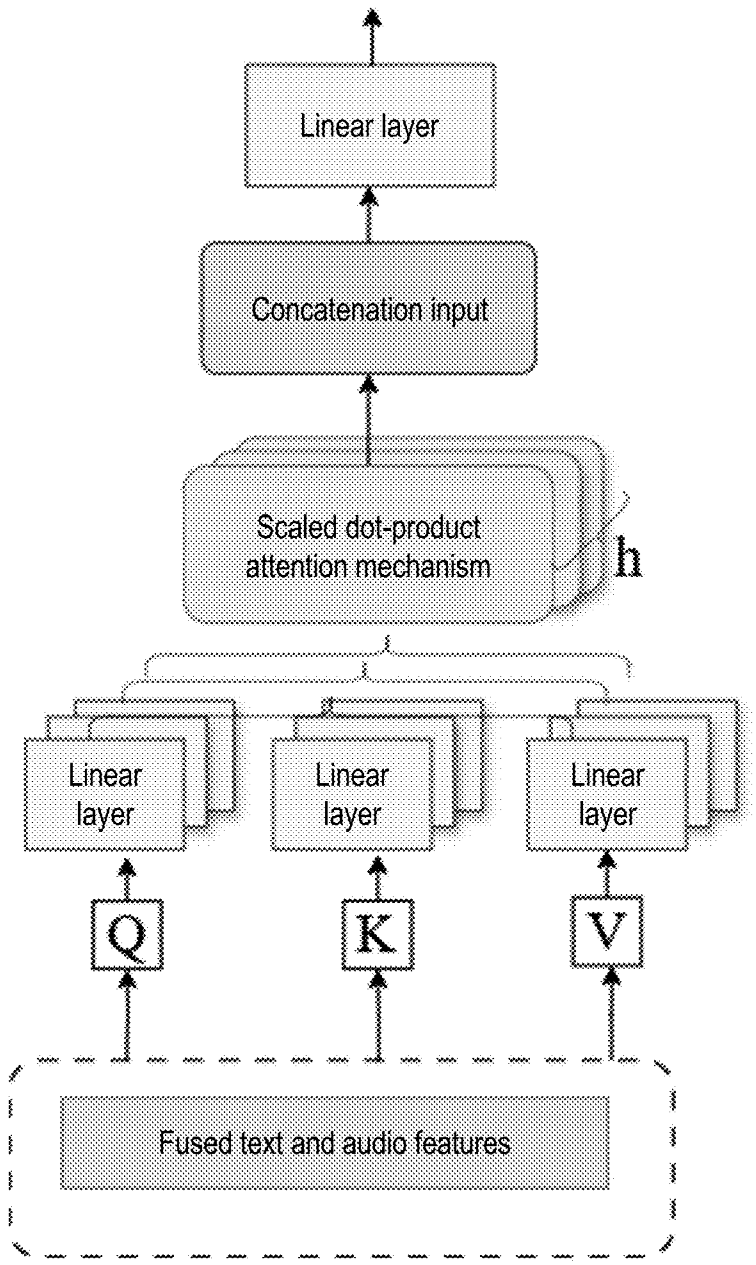
FIG. 5 is a structural diagram of a multi-head attention mechanism according to an embodiment of the disclosure.

The traditional fusion method such as simple feature concatenation has difficulty weighing the importance of different modes. The disclosure adopts the multi-head attention mechanism to fuse feature layers. FIG. 5 is a structural diagram of a multi-head attention mechanism according to an embodiment of the disclosure. As shown in FIG. 5, which is an efficient multi-mode information fusion strategy.

Specifically, the features of the two modes of the text and the voice are first concatenated, and then the concatenated features (such as the fused text and audio features in FIG. 5) are linearly transformed to obtain the representation of the query, the key, and the value. Then, the correlation between the two modes is learned by the multi-head attention mechanism, and the attention weighting is performed on each mode feature to obtain the fused multi-mode fusion feature for the subsequent emotion classification decisions.

3. Multi-Mode Emotion Classification Decision Module

The module performs adaptive dynamic weighted fusion on the decision results obtained from three features (the multi-mode fusion feature, the single-mode text feature, and the single-mode voice feature), allowing the differences between the modes to be considered in the fusion process, achieving more efficient information fusion, and being robust. Different from the simple equal fusion, the weighted fusion may distinguish the roles of different modes, assign higher weights to important modes, and more intelligently fuse the multi-mode information, while maintaining the advantages of simplicity and efficiency and being easy to implement. A formula may be expressed as follows.

$$P = w_f \cdot C_{Fusion} + w_t \cdot C_{text} + w_a \cdot R_{global}$$

In the formula, P is the predicted category probability, $w_f$, $w_t$ and $w_a$ are the fusion weights of adaptive learning, $C_{Fusion}$, $C_{text}$, and $R_{global}$ are the decision results obtained by the multi-mode fusion feature, the text feature, and the voice feature respectively.

The module first optimizes the model for training by the loss function, and then outputs the emotion classification results of each batch of the voice and the text segments by the optimized model. During the training phase, annotated multi-mode emotion data is utilized with a goal of minimizing the prediction error. The fusion strategy makes full use of various features, adaptively learns the optimal mode fusion weights, and generates the robust emotion classification.

It should be noted that in order to improve the robustness of the emotion classification, the disclosure proposes a multi-mode emotion recognition method based on a discourse level, which fuses the multi-mode feature by the multi-head attention mechanism fusion and an adaptive weighted fusion mechanism. In addition to classification decisions based on fused multi-mode features, the disclosure further generates respective classification decisions based on the single text and the audio mode features respectively. Afterwards, a corresponding weight coefficient is adaptively determined according to the confidence of each decision, and the three-way decision results are weighted fused to generate the final emotion classification result.

The disclosure uses the CNN and the multi-head self-attention mechanism. Through local and global joint modeling, the cascaded feature enhancement network, that is, the voice feature extraction layer, directly models the context, fully mining the rich modal information contained in the spectrogram, which is significantly better than the conventional technology.

The disclosure innovatively introduces the pre-trained language model ALBERT to mine semantic features of text. By fine-tuning the ALBERT model and optimizing the pooling strategy, the text may be mapped into word vector representations in contextual semantics. For audio, the disclosure proposes the hierarchical feature extraction network based on the multi-head attention mechanism. The network realizes multi-scale and multi-level spectral feature learning in the time-frequency domain, ensures the fusion of local fine-grained and global information, models the emotion features at different levels, and achieves complementary advantages. Finally, the enhanced text and the audio are fused by the multi-head attention mechanism to output the emotion classification results.

4. Comparison of Test Result

The experimental results of the disclosure were compared with the model results of the voice emotion recognition experiment also performed on the IEMOCAP dataset in the related art. The weighted accuracy (WA) is used as an evaluation indicator. The specific comparative experimental results are shown in Table 1.

TABLE 1

Comparative experimental results of IEMOCAP dataset

| Method | Dataset | Weighted accuracy (%) |
|---|---|---|
| c-LSTM | IEMOCAP | 51.17 |
| c-LSTM + Att | IEMOCAP | 56.32 |
| DialogueRNN | IEMOCAP | 63.40 |
| LA-MER | IEMOCAP | 72.5 |
| MDRE | IEMOCAP | 71.8 |
| Present application | IEMOCAP | 79.46 |

Figure 6:
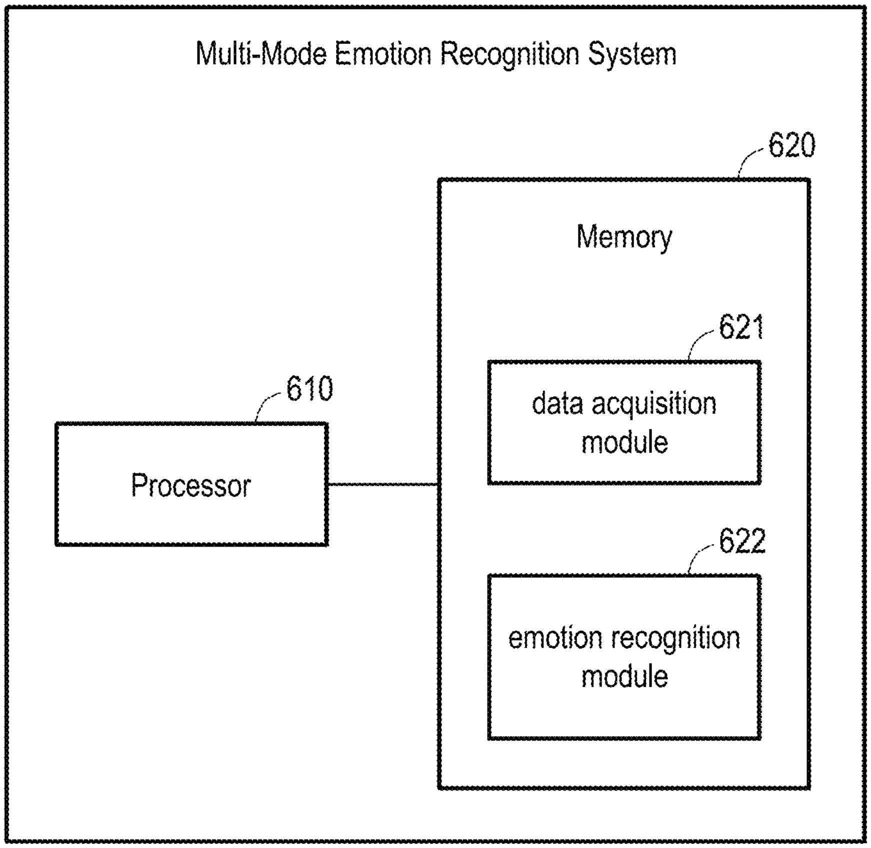
FIG. 6 is an architecture diagram of a multi-mode emotion recognition system according to an embodiment of the disclosure.

Based on any of the above embodiments, the disclosure provides a multi-mode emotion recognition system. FIG. 6 is an architecture diagram of a multi-mode emotion recognition system according to an embodiment of the disclosure. As shown in FIG. 6, the system includes a processor 610 and a memory 620. The memory stores a data acquisition module 621 and an emotion recognition module 622. The processor is configured to execute the modules stores in the memory. The processor is configured to execute the data acquisition module 621 to obtain the spectrogram of the voice to be recognized and the corresponding text. The processor is configured to execute the emotion recognition module 622 to input the spectrogram and the text into the multi-mode emotion recognition model to obtain the emotion recognition result output by the multi-mode emotion recognition model.

The multi-mode emotion recognition model is trained based on the sample spectrogram, a corresponding sample text, and a sample emotion recognition result. The multi-mode emotion recognition model is configured to perform the feature extraction on both the spectrogram and the text by the self-attention mechanism to obtain the voice feature and the text feature, perform the feature fusion on the text feature and the voice features to obtain the multi-mode fusion feature, and perform the emotion classification decision based on the text feature, the voice feature, and the multi-mode fusion feature to obtain the emotion recognition result.

The system provided in the embodiment of the disclosure constructs the multi-mode emotion recognition model and performs the feature extraction on both the spectrogram and the corresponding text by the self-attention mechanism, so as to capture the voice feature and the text feature in contextual information, and then fuses the text feature and the voice feature to obtain the multi-mode fusion feature, and finally combines the multi-mode fusion feature, the single-mode text feature, and the single-mode voice feature to make the emotion classification decision. Therefore, the information of different modes complements each other, improving the robustness and accuracy of emotion classification greatly.

It should be understood that the detailed functional implementation of each of the above modules may be found in the introduction of the aforementioned method embodiment, and is not repeated herein.

Figure 7:
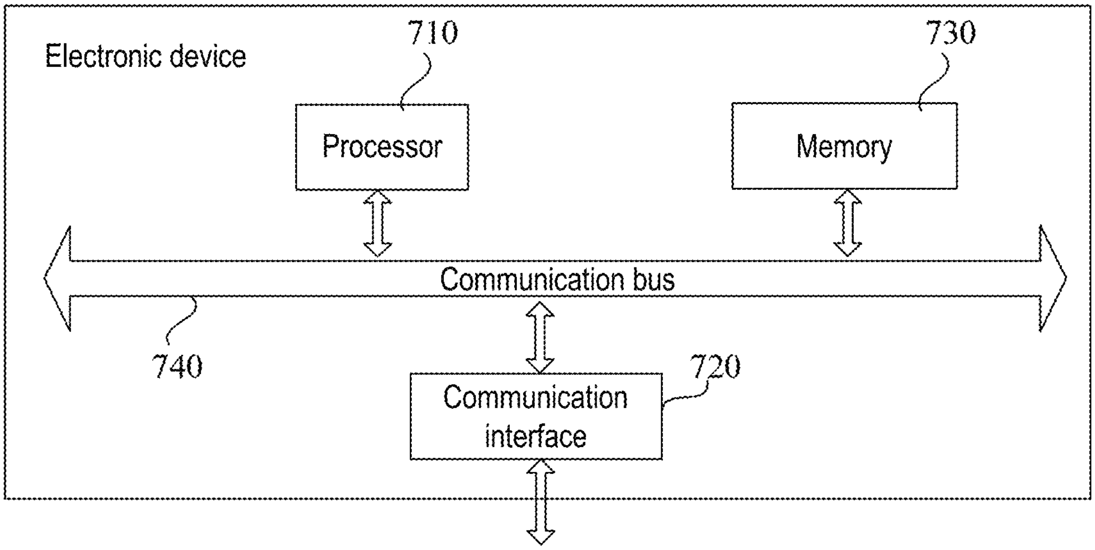
FIG. 7 is a schematic structural diagram of an electronic device according to an embodiment of the disclosure.
Figure 8:
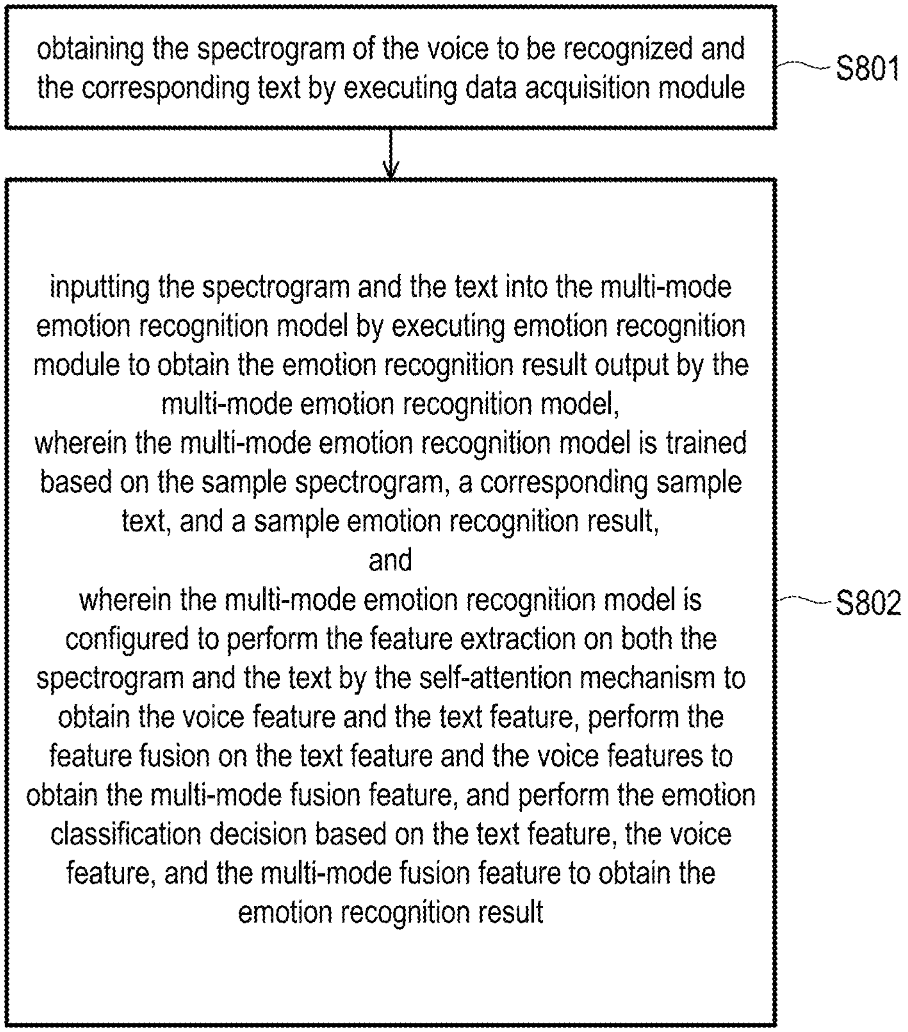
FIG. 8 is an operation flow diagram of a multi-mode emotion recognition system according to an embodiment of the disclosure.

Based on the method in the above embodiment, an embodiment of the disclosure provides an electronic device. FIG. 7 is a schematic structural diagram of an electronic device according to an embodiment of the disclosure. As shown in FIG. 7, the electronic device may include a processor 710, a communication interface 720, a memory 730, and a communication bus 740. The processor 710, the communication interface 720, and the memory 730 communicate with each other by the communication bus 740. The processor 710 may call the logic instructions in the memory 730 to execute the method in the above embodiment.

In addition, the logic instructions in the memory 730 described above may be implemented in the form of software functional units and when sold or used as independent products, may be stored in a computer-readable storage medium. Based on the understanding, the technical solution of the disclosure may essentially be embodied in the form of a software product, or the part that contributes to the related art, or the part of the technical solution. The computer software product is stored in a storage medium and includes a number of instructions for enabling a computer device (which may be a personal computer, a server, or a network device, etc.) to execute all or part of the steps of the method described in each embodiment of the disclosure.

Based on the method in the above embodiment, an embodiment of the disclosure provides the computer-readable storage medium, which stores a computer program.

When the computer program is executed on a processor, the processor executes the method in the above embodiment.

Based on the method in the above embodiment, an embodiment of the disclosure provides a computer program product. When the computer program product is executed on the processor, the processor executes the method in the above embodiment.

It should be understood that the processor in the embodiment of the disclosure may be a central processing unit (CPU), other general-purpose processors, digital signal processors (DSP), application specific integrated circuits (ASIC), field programmable gate arrays (FPGA), other programmable logic devices, transistor logic devices, hardware components, or any combination thereof. A general-purpose processor may be a microprocessor or any regular processor.

The method steps in the embodiments of the disclosure may be implemented by hardware, or by a processor executing software instructions. The software instructions may be composed of corresponding software modules. The software modules may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a mobile hard disk, a CD-ROM, or any other form of storage medium known in the art. An exemplary storage medium is coupled to the processor, so that the processor may read information from, and write information to, the storage medium. Of course, storage media may also be part of the processor. The processor and the storage medium may reside in an ASIC.

In the above embodiments, all or part of them may be implemented by software, hardware, firmware, or any combination thereof. When implemented using software, all or part of the implementation may be in the form of a computer program product. The computer program product includes one or more computer instructions. When the computer program instructions are loaded and executed on a computer, the process or function described in the embodiments of the disclosure is generated in whole or in part. The computer may be a general purpose computer, a special purpose computer, a computer network, or other programmable device. The computer instructions may be stored in or transmitted via a computer-readable storage medium. The computer instructions may be transmitted from a website, a computer, a server, or a data center to another website, computer, server or data center via wired (for example, coaxial cable, optical fiber, digital subscriber line (DSL)) or wireless (for example, infrared, wireless, microwave, etc.) means. The computer-readable storage medium may be any available medium accessed by the computer or the data storage device such as the server or the data center including one or more available media. The available medium may be a magnetic medium (for example, a floppy disk, a hard disk, a magnetic tape), an optical medium (for example, a DVD), or a semiconductor medium (for example, a solid state disk (SSD)).

Based on the above, the disclosure can be implements as the following:

Health and psychological counseling: By obtaining multimodal data through audio and video equipment, and using multimodal emotion recognition algorithms to characterize, model, and identify the patient's emotional state, thereby obtaining real-time emotional status, helping psychologists and counselors understand the patient's emotional changes in real time, and provide more accurate treatment and advice to the patient. In telemedicine consultations, multi-mode emotion recognition method is used to help doctors understand the patient's emotional state and make a more comprehensive diagnosis.

In general, the above technical solutions conceived by the disclosure have the following beneficial effects compared with the related art. The disclosure provides a multi-mode emotion recognition method, a system, an electronic device, and a storage medium. By constructing the multi-mode emotion recognition model, the self-attention mechanism is used to extract the feature from the spectrogram and the corresponding text so as to capture the voice feature and the text feature in contextual information, and then the text feature and the voice feature are fused to obtain the multi-mode fusion feature. Finally, the multi-mode fusion feature, the single text feature and single voice feature are combined to make an emotion classification decision, so that the information of different modes complements each other, greatly improving the robustness and accuracy of emotion classification.

It should be understood that the various reference numerals involved in the embodiments of the disclosure are only used for the convenience of description and are not used to limit the scope of the embodiments of the disclosure.

It will be easily understood by people skilled in the art that the above description is only a preferred embodiment of the disclosure and is not intended to limit the disclosure. Any modifications, equivalent substitutions, and improvements made within the spirit and principles of the disclosure shall be included in the scope of protection of the disclosure.

What is claimed is:

1. A multi-mode emotion recognition method, comprising:

obtaining a spectrogram of a voice to be recognized and a corresponding text;

inputting the spectrogram and the corresponding text into a multi-mode emotion recognition model to obtain an emotion recognition result output by the multi-mode emotion recognition model;

wherein the multi-mode emotion recognition model is trained based on a sample spectrogram, and a corresponding sample text, and a sample emotion recognition result, the multi-mode emotion recognition model is configured to extract a feature from the spectrogram and the corresponding text by a self-attention mechanism to obtain a voice feature and a text feature, fuse features of the text feature and the voice feature to obtain a multi-mode fusion feature, and make an emotion classification decision to obtain the emotion recognition result based on the text feature, the voice feature, and the multi-mode fusion feature, wherein the multi-mode emotion recognition model specifically extracts the feature from the spectrogram by a voice feature extraction network, and the voice feature extraction network comprises a patch embedding layer, a plurality of voice feature extraction layers based on a local self-attention mechanism and a global self-attention mechanism, and a Transformer encoder connected in sequence, wherein each voice feature extraction layer comprises a convolutional pooling layer, a patch embedding layer, a plurality of voice encoder layers, and an aggregation layer connected in sequence, and each voice encoder layer is configured to extract the local feature within each patch by the local self-attention mechanism first, extract features between patches to obtain a global sequence feature by the global self-attention mechanism, and finally perform a nonlinear transformation on the global sequence feature.

2. The method according to claim 1, wherein the step of fusing the text feature and the voice feature to obtain the multi-mode fusion feature specifically comprises:

concatenating the text feature and the voice feature to obtain a concatenated feature, and extracting an attention feature from the concatenated feature by a multi-head attention mechanism to obtain the multi-mode fusion feature.

3. An electronic device, comprising:

at least one memory, configured to store a computer program; and at least one processor, configured to execute the computer program stored in the memory, wherein the processor is configured to execute the method according to claim 2 when the computer program stored in the memory is executed.

4. A non-transitory computer-readable storage medium stored in a computer program, wherein a processor is caused to execute the method according to claim 2 when the computer program is executed on the processor.

5. The method according to claim 1, wherein the step of making the emotion classification decision to obtain the emotion recognition result based on the text feature, the voice feature, and the multi-mode fusion feature comprises:

making the emotion classification decision respectively to obtain a text decision result, a voice decision result, and a multi-mode decision result based on the text feature, the voice feature, and the multi-mode fusion feature; and adaptively and dynamically weighted fusing the text decision result, the voice decision result, and the multi-mode decision result to obtain the emotion recognition result.

6. An electronic device, comprising:

at least one memory, configured to store a computer program; and at least one processor, configured to execute the computer program stored in the memory, wherein the processor is configured to execute the method according to claim 5 when the computer program stored in the memory is executed.

7. A non-transitory computer-readable storage medium which stores by a computer program, wherein a processor is caused to execute the method according to claim 5 when the computer program is executed on the processor.

8. An electronic device, comprising:

at least one memory, configured to store a computer program; and at least one processor, configured to execute the computer program stored in the memory, wherein the processor is configured to execute the method according to claim 1 when the computer program stored in the memory is executed.

9. A non-transitory computer-readable storage medium stored in a computer program, wherein a processor is caused to execute the method according to claim 1 when the computer program is executed on the processor.

10. A multi-mode emotion recognition system, comprising:

a memory and a processor, wherein the memory stores a data acquisition module and an emotion recognition module, the processor is coupled to the memory, wherein the processor is configured to execute:

the data acquisition module to obtain a spectrogram of a voice to be recognized and a corresponding text; and the emotion recognition module to input the spectrogram and the corresponding text into a multi-mode emotion recognition model to obtain an emotion recognition result output by the multi-mode emotion recognition model;

wherein the multi-mode emotion recognition model is trained based on a sample spectrogram, and a corresponding sample text, and a sample emotion recognition result, the multi-mode emotion recognition model is configured to extract a feature from the spectrogram and the corresponding text by a self-attention mechanism to obtain a voice feature and a text feature, fuse features of the text feature and the voice feature to obtain a multi-mode fusion feature, and make an emotion classification decision based on the text feature, the voice feature and the multi-mode fusion feature to obtain the emotion recognition result, wherein the multi-mode emotion recognition model specifically extracts the feature from the spectrogram by a voice feature extraction network, and the voice feature extraction network comprises a patch embedding layer, a plurality of voice feature extraction layers based on a local self-attention mechanism and a global self-attention mechanism, and a Transformer encoder connected in sequence, wherein each voice feature extraction layer comprises a convolutional pooling layer, a patch embedding layer, a plurality of voice encoder layers, and an aggregation layer connected in sequence, and each voice encoder layer is configured to extract the local feature within each patch by the local self-attention mechanism first, extract features between patches to obtain a global sequence feature by the global self-attention mechanism, and finally perform a nonlinear transformation on the global sequence feature, wherein the emotion recognition result is for helping customer service personnel adjusting response strategies.

* * * * *